Figure 1:
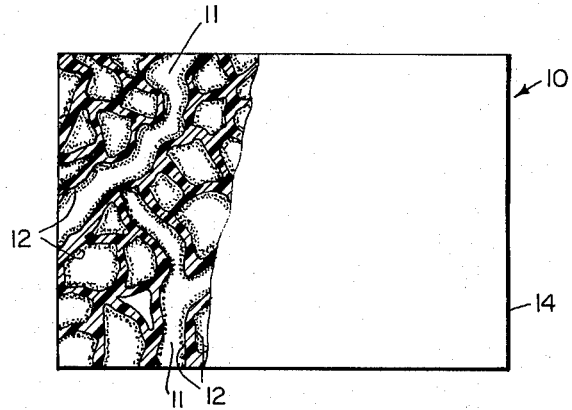

Feb. 1, 1966     I. H. KELLMAN     3,232,786
SEALING MEANS
Filed Oct. 26, 1962

INVENTOR.
Irving H. Kellman
BY
Ezekiel Wolf, Wolf & Greenfield
ATTORNEYS

United States Patent Office 3,232,786
Patented Feb. 1, 1966

3,232,786
SEALING MEANS
Irving H. Kellman, Springvale, Maine, assignor, by mesne assignments, to Fieldcrafts, Inc., Cambridge, Mass., a corporation of New Hampshire
Filed Oct. 26, 1962, Ser. No. 233,245
8 Claims. (Cl. 117—98)

The present invention relates to a plastic foam sealing means and more particularly to a flexible, coated organic foam which is highly resistant to aging and is adapted to act as a barrier or positive fluid stop.

Plastic foam materials are often used as barrier materials or water stops and gasket materials. In many cases, it is found that the plastic foam deteriorates with age and exposure to oxidizing conditions. For these reasons, it has been proposed to coat the foam materials in various manners. The coating substances frequently add substantially to the cost of the foam sealing material and/or are limited in coloring ability and have low slump resistant properties. The coloring of foam sealing materials is extremely important in certain applications where the material is exposed in its final position. Coating materials having low slump resistant properties tend to flow out of position in normal use impairing appearance of sealed joints and in extreme cases, destroy fluid resistance of these joints.

It is an object of this invention to provide a novel and improved non-bleeding, sealing means which can be resiliently compressed and placed into a joint to be sealed whereupon the sealing means expands to tightly fill the joint and prevent fluid flow.

It is another important object of this invention to provide a sealing means in accordance with the preceding object which is relatively low in cost and may be easily manufactured in large quantities.

It is a still further object of this invention to provide a non-bleeding sealing means in accordance with the preceding objects which can be attractively colored to blend with any environment in which the sealing means is to be used.

The sealing means of this invention has a soft, elastically flexible, organic plastic foam base. The organic foam is preferably an "opened" or interconnecting cellular polyether foam which may be elastically compressed to a high percentage of its original volume. The cell walls of the polyether foam are coated with a protective fluid impervious organic material comprising polybutene or polyisobutylene which does not radically affect the elastic and compressible properties of the polyether foam. Various additives and fillers may be added to the polybutene or polyisobutylene to lower cost and/or modify water resistant and antislump properties of these materials. This sealing means is particularly effective when compressed into a joint to be sealed and allowed to expand slightly against the restrictions imposed by the joint. In such applications the foam at all times bears outwardly against the joint and is compressed to a sufficient degree to insure closing of interconnecting passageways through the foam body. This feature positively prevents water seepage through the sealing means.

Since substantially clear, coating materials such as polybutene or polyisobutylene are employed these materials may have suitable additives to provide any desired color to the sealing means. The coating materials are further advantageous in that they are relatively inexpensive and may be quickly and easily applied to the foam base at minimum cost.

The cost of the sealing means may be drastically reduced in some cases by using scrap pieces of the polyether foam as the base. Small trimimngs or scrap pieces of larger pieces, having volumes of at least one-half cubic inch may be impregnated or coated by the coating materials of this invention. A plurality of trimmings can be packed together in a joint to be sealed. Thorough stuffing of the joint will insure closing of all passageways preventing water passage through the joint.

Figure 2:
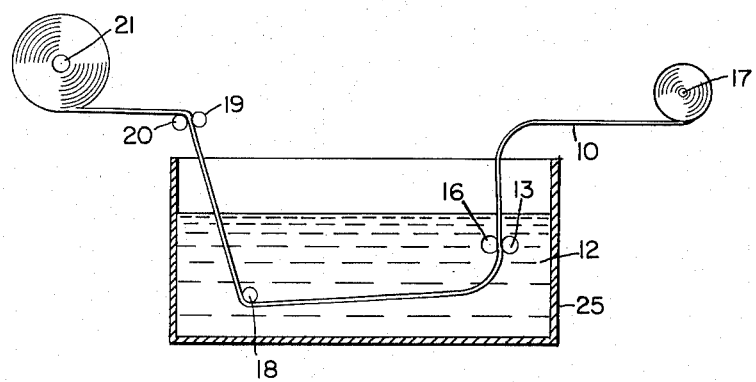

Other features, objects and advantages of the invention will be better understood and appreciated from the following detailed description of one embodiment thereof, selected for purposes of illustration and shown in the accompanying drawings, in which:

FIG. 1 is a cross-sectional view through a sealing material of this invention showing a portion of the cellular structure; and FIG. 2 is a schematic representation of a method of making the sealing means of this invention.

With reference now to the drawings, a sealing material or fluid stop 10 is illustrated in FIG. 1 and has a base composed of a polyether interconnecting cell, soft, elastic foam block 14. The polyether foam is basically a polyurethane foam derived from a reaction between a diisocyanate and hydroxyl groups contained in a polyether or mixture of polyethers. A plurality of interconnecting cells 11 of the foam block 14 provide passageways through the block. Preferably each of the cells has a thin coating material 12 forming a protective layer over all cell surface areas of the foam block 14.

Preferably the foam has a density of from 1 to 10 pounds per cubic foot. Other densities may be employed however it has been found that when lower densities are employed the water blockage property of the sealing means 10 may be impaired unless large quantities of coating material are used. When higher densities are used the cost per unit volume is increased.

The polyether urethane foams are well known in the art and the particular type of polyether starting material may be varied as desired consistent with maintaining the sealing means inexpensive. Preferably the number of hydroxyl groups per polyether molecule is low and is close to 2 as possible. Normally the lower the number of hydroxyl groups per molecule the higher the elasticity of the resulting foam. One particularly useful polyether foam is that derived from methyl glucoside which has been obtained from corn starch and is capable of polyetherification with ethylene oxide or propylene oxide. Derivatives of the above type may be subsequently cross-linked with diisocyanates such as 2,4-toluene diisocyanate, or mixtures of 80% 2,4- and 20% 2,6-toluene isocyanate or 65% 2,4- and 35% 2,6-toluene diisocyanate. Such foams are well described in the literature as for example in Modern Plastics, November 1961, at page 151. Other suitable starting polyether materials include "Petronic 701" sold and manufactured by Wyandotte Chemical Corp. having a functionality of 4 and equivalent weight of 865, a base of ethylene diamines and an oxide of propylene/ethylene; "11–300" manufactured by Dow Chemical Co. having a functionality of 3 and equivalent weight of 1333, a base of glycerine and an oxide of propylene; "PPG–2025" manufactured by Union Carbide Corp. having a functionality of 2 and equivalent weight of 1,000, a base of propylene glycol and an oxide of propylene; and, "Pluronic L–61" manufactured by Wyandotte Chemical Corp. having a functionality of 2 and equivalent weight of 1,000, a base of propylene glycol and an oxide of propylene/ethylene.

Polyether foams found to be particularly useful in the present invention have properties as set forth in Table 1 below:

TABLE 1

Property:
| | |
|---|---|
| (1) Density, pounds/cubic foot | 1.9–2.9 |
| Tensile, p.s.i. | 6.0–25.2 |
| Elongation, percent | 125–545 |
| Comp. set, percent | 6–17 |
| Comp. load, p.s.i. 25% deflection | 0.23–0.40 |
| 50% deflection | 0.32–0.56 |
| Resiliency, percent | 20–26 |

It has been found that the known polyether foams of the type above described are susceptible to oxidizing conditions upon aging and tend to yellow or otherwise degenerate. For this reason, and in addition to increase the fluid impermeability of the foam, coating materials are impregnated into the foam and form a thin coating over the cell walls. Care must be taken to avoid filling of the cells with the coating material since the elastic feature of the foam may be destroyed when the cells are filled. Preferably, the coating material comprises 51 to 92% by weight of the entire sealing means. Of course the particular percentages will vary greatly depending upon the specific polyether foam and specific coating material composition.

Polybutene has been found to be a particularly effective coating material for use in sealing means of this invention. The polybutene used may comprise 1-butene, 2-butene, isobutylene or mixtures thereof in the polymer chain. Polybutenes are generally light in color if not colorless and are normally stable when exposed to light. In addition, they readily adhere to polyether and other foams and form viscous, water impervious coatings over the cell walls of the foam as shown in FIG. 1 at 12. These coatings 12 can be formulated so as to remain in position in the foam cells and will not bleed or slump at temperatures within the range of −20 to +212° F. Moreover, the polybutenes employed being highly viscous, do not tend to stiffen the foam or impair the elastic properties thereof. Preferably, polybutene compositions used in this invention have mean molecular weights between 300 and 27,000, viscosity at 100° F. SSU of at least 300, at 210° F. SSU viscosities at least 40 and Gardner-Holdt viscosities at 77° F. greater than A.

The particular properties of the polybutenes may vary considerably depending upon fillers employed with these materials. In some cases polybutene used may have a mean molecular weight as low as 300 or as high as 100,000. When low mean molecular weight materials are employed fillers must be used to increase anti-slump properties. When high mean molecular weight materials are used heating is necessary during impregnation to allow uniform filling of the foam cells.

One particularly effective polybutene composition is manufactured by Amoco Chemicals Corporation and designated "Indopol" Polybutene H-300 and comprises a series of butylene polymers composed predominantly of high molecular weight polybutylenes (85–98%) with the balance being isoparaffins.

The polybutene may comprise polyisobutylene such as the trademark product "Vistanex" manufactured by Enjay Chemical Company. The "Vistanex" polyisobutylenes are highly paraffinic hydrocarbon polymers composed of long straight-chain molecules having terminal unsaturation only. "Vistanex" materials having Staudinger average molecular weights of 8 to 12,000 are particularly desirable.

"Oronite" polybutenes produced by California Chemical Company and containing mixtures of 1-butene, 2-butene and polyisobutylene in the polymer structure are also highly desirable for usage as the coating material of this invention. These polybutenes normally have SSU viscosities at 210° F. of from 40 to 20,000.

Many combinations of fillers, additives, and coloring agents may be employed with coating compositions of this invention. Drying oils which form skins over the coating composition and effectively reduce tackiness may be employed such as soya oil, linseed oil, fish oil, castor oil, cottonseed oil, tung oil or oiticica oil. Reduction of tackiness facilitates handling of the sealing means. In some cases where it is desirable to quickly impregnate the foam, a wetting agent such as a fatty acid and particularly soya fatty acid may be used. When wetting agents are used, it is sometimes desirable to include a dryer to promote drying of the coating composition without the need for a heat applying step. Conventional driers such as metallic or cobalt soaps including cobalt napththenate, cobalt octoate or cobalt tallate and dibutylthiourea may be employed in suitable quantities. The dryer may also be used when solvents are employed to disperse the coating material on the foam. Typical solvents which may be used include mineral spirits.

Conventional fillers for polybutene may also be incorporated in the coating material to reduce cost and in some cases act as coloring agents. Such filters include talc, atomite and calcium carbonate. Surprisingly, it has been found that low molecular weight compatible aliphatic hydrocarbon polymers such as polyethylene, polypropylene, polystyrene and polyvinylchloride are particularly advantageous for use as fillers in conjunction with the polybutenes previously described. These materials may be incorporated as soft solids or pellets into the polybutenes of this invention and thoroughly mixed therewith. These materials enhance the anti-slump properties of the polybutenes and prevent bleeding of the coating material from the foam. The particular amounts of polybutene in the coating material will vary depending upon the particular additives used. Generally the polybutene content is high with additives other than coarse inorganic fillers amounting to minor percentages by weight of the composition.

Antioxidants and stabilizers may be formulated with the coating materials of this invention using conventional procedures. Such additives include polymerized trimethyl dihydroquinoline, phenyl beta-naphthylamine, p-hydroxyphenyl morpholine, zinc dibutyl dithiocarbamate, selenium dithiocarbamate and n-acyl p-amino phenols.

One method of coating the polyether foam of this invention with the coating material is diagrammatically illustrated in FIG. 2. A roll 17 of soft polyether foam is continuously unwound allowing a sheet 10 of the polyether foam to be drawn between squeeze rolls 13 and 16 mounted in a heated tank 25 carrying the coating material 12 in liquid form. The rolls 13 and 16 are mounted at or below the level of the liquid. After passage through the squeeze rolls 13 and 16 where air is squeezed out of the foam, the foam expands and draws in the coating material 12 which fills the foam cells. The sheet 10 then passes over the guide roll 18 and is drawn up into the calendering rolls 19 and 20 which again squeeze the sheet to remove excess coating material. After the sheet leaves the calendering rolls 19 and 20 it again expands and only a thin coating of coating material remains covering the walls of the cells. The sheet may then be wound on a conventional take-up roll 21. Subsequently any desired size sealing means may be cut from the completed sheet.

The coating procedure may be accomplished by other means if desired. For example, a block of polyether foam may be compressed by a hand press while immersed in a liquid coating bath. Release of the pressure allows the foam to expand and draw in the coating material. Subsequent removal of the foam and compression removes the excess coating material and leaves the cell walls coated.

The following specific examples illustrate preferred formulations for the sealing means of this invention.

*Example 1*

Using the apparatus shown in FIG. 2, a 2-inch thick sheet of elastic interconnecting cell polyether foam having a density of 2.3 lbs./cu. ft. is passed through the squeeze rolls 13 and 16 and compressed to a thickness of approximately ¼ inch. "Indopol" Polybutene H-300 having a mean molecular weight of 1100 and viscosity at 210° F., SSU of 3,000 and a pour point (ASTM) ° F. of 35 is heated in the tank 25 to a temperature of 100° C. The sheet of polyether foam expands slowly in the tank and is impregnated with the polybutene. Thereafter, calendering rolls 19 and 20 again compress the foam to approximately ¼ inch thickness and the foam sheet is allowed to expand and wound on a take-up roll.

The resultant product has a total weight of 19 grams per square foot of which approximately 2 grams are the polyether foam and 17 grams are polybutene.

It is found that the physical properties of the sealing means thus formed are substantially similar to the uncoated starting polyether foam. When compressed to approximately 75% of its original volume the sealing means formed prevents passage of water therethrough at pressures of at least 6 feet of water. The polybutene coating does not slump at temperatures as high as 212° F.

*Example 2*

An elastic polyether foam block having a density of approximately 2.3 pounds per square foot and comprising interconnecting cells was immersed in a tank containing 5 gallons of "Vistanex," a polyisobutylene polymer having an average molecular weight of 10,000 manufactured by Enjay Chemical Company. The impregnating solution of "Vistanex" was heated to a temperature of 100° C. The foam block was compressed to approximately 10% of its original volume and allowed to slowly expand while in the impregnating solution. After a period of 3 minutes the block was removed from the bath then compressed again to approximately 10% of its original volume and allowed to again expand.

The resultant product when compressed to approximately 70% of its original volume acts as a positive barrier or fluid stop and prevents passage of water therethrough at pressures at least as high as 6 feet of water. The resultant sealing means has a clear slightly tacky coating of "Vistanex" covering the cell walls. Upon exposure to sunlight for 60 days no yellowing or deterioration of physical properties of the sealing means was observed.

When an elastic polyester urethane foam is employed in place of the polyether foam of Example 2, it is found that slight yellowing occurs after exposure to sunlight for 30 days and slight embrittlement of the foam is evidenced.

In Examples 3–10 various combinations of coating materials and foams were employed. In all cases antislump properties were good, discoloration and aging deterioration in sunlight were not evidenced and physical properties of the coated foam were substantially the same as the uncoated foam employed. Formulations of the coating materials and foam are given in the following table and in all cases the procedure of Example 2 was followed:

| Example | Foam | Coating Solution |
|---|---|---|
| 3 | Polyether (elastic open cell) urethane based on methyl glucoside ethylene oxide, density 2.0 lbs./cu. ft. | H-1900 Indopol Polybutene (a series of butylene polymers with a mol. wt. of 1,900, viscosity at 210° F. of SSU 20,500, Pour Point (ASTM) ° F. of 75, weight/U.S. gallon 7.61). |
| 4 | Polyether (open cell, urethane foam), density 2.8. | H-1900 Indopol Polybutene, 95 gr.; microcrystalline wax, 5 gr. |
| 5 | ----do---- | H-300 Indopol Polybutene (similar to H-1900) having a mean mol. wt. of 11,000 and viscosity at 210° F. of SSU 3,000, 85 gr.; microcystalline wax, 5 gr.; talc (powdered), 10 gr. |
| 6 | ----do---- | H-300 Indopol Polybutene, 98 gr.; Mortar cement, 2 gr. |
| 7 | ----do---- | H-1900 Indopol Polybutene, 95 gr.; low molecular weight polystyrene beads, 5 gr. |
| 8 | Polyether (elastic open cell, urethane foam, density 2.5. | H-1900 Indopol Polybutene, 98 gr.; low molecular weight polyethylene beads, 2 gr. |
| 9 | ----do---- | H-1900 Indopol Polybutene, 88 gr.; Microcrystalline wax, 5 gr.; Talc (finely ground), 20 gr.; Polypropylene, 5 gr. |
| 10 | ----do---- | H-1900 Indopol Polybutene, 95 gr.; Silicon Dioxide (powdered), 2 gr.; Aluminum Powder, 3 gr. (3XD Reynolds). |
| 11 | ----do---- | H-300 Indopol Polybutene, 240 gr.; Castor Oil, 10.3 gr.; Cobalt Naphthenate, .5–1.3 gr.; Aluminum Flakes (3XD Reynolds), 1.3 gr.; Silicon Dioxide (powdered), 5.2 gr. |
| 12 | ----do---- | Vistanex (a polyisobutylene polymer having a mean molecular weight of 12,000), 200 gr.; Talc, 30 gr.; Aluminum Flakes (3XD Reynolds), 4 gr.; Silicon Dioxide (powdered), 8 gr.; Castor Oil, 8 gr.; Cobalt Naphthenate, 1 gr. |
| 13 | ----do---- | Oronite Polybutene PB20 (butene polymer having a viscosity at 210° F., SSU 550), 230 gr.; Castor Oil, 12 gr.; Cobalt Naphthenate, 1.2 gr.; Aluminum Flakes (3XD Reynolds), 2.3 gr.; Silicon Dioxide (powdered), 4.6 gr.; Talc (finely ground), 12 gr. |

Examples 9 and 10 are illustrative of white and aluminum colored foam sealing means which may be formed according to the invention. Any of the above formulations may be colored as desired by addition of suitable coloring agents such as 2% by weight of Pittsburgh Plate Glass polyester coloring agents which include blue, black, orange, red, yellow and other pigments.

Alternatively, in some cases the starting foam block may have a coloring agent incorporated during its manufacture and a clear polybutene coating used. In these cases the color of the foam base can be seen through the clear coating.

While I have shown several specific examples of preferred embodiments of the invention, it should be understood by those skilled in the art that many modifications are possible. For example, while I prefer to employ polyether foams, other elastic foams may be used although their physical properties may not be as desirable. Thus, polyester-urethane foams, vinyl foams, etc. may be used. The particular fillers and additives may be varied depending upon specific conditions of usage of the sealing means. Various additional antioxidants, dryers, etc. may be employed to prevent aging in both the foam and coating materials. Therefore this invention is not to be limited by the recited examples. All modifications of this invention within the broad limits of the following claims are considered to be covered by the present invention.

What is claimed is:

1. A sealing means comprising a base of an elastic, organic polyurethane foam having interconnecting cells defining cell walls, a coating covering cell walls substantially throughout said foam and consisting essentially of polybutene in an amount of 51 to 92% by weight of the total weight of the sealing means with said coating acting to prevent oxidative degeneration of said foam and acting in conjunction with said foam to prevent passage of fluids through said interconnecting cells when said sealing means is compressed.

2. A sealing means in accordance with claim 1 wherein said polybutene is polyisobutylene.

3. A sealing means in accordance with claim 1 wherein said polybutene has a mean molecular weight in the range of 300 to 27,000.

4. A sealing means in accordance with claim 1 wherein said polybutene contains a coloring agent incorporated therein.

5. A sealing means in accordance with claim 1 wherein said foam contains a coloring agent incorporated therein and said coating is non-obstructing to visual inspection of said foam.

6. A sealing means in accordance with claim 1 wherein said polybutene has incorporated therein a low molecular weight aliphatic hydrocarbon polymer compatible with polybutene and acting to enhance anti-slump and non-bleeding characteristics of said polybutene material.

7. A sealing means in accordance with claim 6 wherein said foam is a polyether foam having a density of from approximately 1 to 10 pounds per cubic foot.

8. A sealing means in accordance with claim 1 wherein said foam is a polyether foam having a density of from approximately 1 to 10 pounds per cubic foot and said polybutene has incorporated therein a minor amount of a low molecular weight aliphatic hydrocarbon polymer and microcrystalline wax.

References Cited by the Examiner

UNITED STATES PATENTS

| | | |
|---|---|---|
| 2,054,115 | 9/1936 | Abrams et al. __ 260—94.8 XR |
| 2,131,342 | 9/1938 | Balderschwieler __ 260—94.8 XR |
| 2,335,321 | 11/1943 | Szegvari et al. ____ 117—98 XR |
| 2,806,256 | 9/1957 | Smith-Johannsen __ 117—161 XR |
| 2,963,388 | 12/1960 | Landeuar ____ 117—138.8 XR |
| 2,964,424 | 12/1960 | Mast _____ 117—98 XR |

WILLIAM D. MARTIN, *Primary Examiner.*

RICHARD D. NEVIUS, *Examiner.*

C. A. HAASE, S. W. ROTHSTEIN, *Assistant Examiners.*